United States Patent
Mizuo

(10) Patent No.: US 11,886,977 B2
(45) Date of Patent: Jan. 30, 2024

(54) COMPUTING APPARATUS, COMPUTING METHOD, STORAGE MEDIUM, AND TABLE GENERATING APPARATUS

(71) Applicant: CANON KABUSHIKI KAISHA, Tokyo (JP)

(72) Inventor: Yoshihiro Mizuo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 464 days.

(21) Appl. No.: 17/155,686

(22) Filed: Jan. 22, 2021

(65) Prior Publication Data
US 2021/0241077 A1    Aug. 5, 2021

(30) Foreign Application Priority Data

Feb. 5, 2020    (JP) ................................ 2020-018209

(51) Int. Cl.
*G06N 3/048*    (2023.01)
*G06N 3/08*    (2023.01)

(52) U.S. Cl.
CPC ............... *G06N 3/048* (2023.01); *G06N 3/08* (2013.01)

(58) Field of Classification Search
None
See application file for complete search history.

(56) References Cited

U.S. PATENT DOCUMENTS

| 5,742,741 A | 4/1998 | Chiueh et al. |
| 2019/0147323 A1* | 5/2019 | Li .......................... G06N 3/048 |
| | | 706/15 |

FOREIGN PATENT DOCUMENTS

| JP | H06175999 A | 6/1994 |
| JP | H10252537 A | 9/1998 |

OTHER PUBLICATIONS

Wang, Min, Baoyuan Liu, and Hassan Foroosh. "Look-up table unit activation function for deep convolutional neural networks." 2018 IEEE Winter Conference on Applications of Computer Vision (WACV). IEEE, 2018. (Year: 2018).*

* cited by examiner

Primary Examiner — Eric Nilsson
(74) Attorney, Agent, or Firm — ROSSI, KIMMS & McDOWELL LLP

(57) ABSTRACT

There is provided a computing apparatus that includes: a retaining unit configured to retain an approximation table that approximately represents an activation function of a neural network, the approximation table mapping between a plurality of discrete input samples of the activation function and output samples respectively corresponding to the plurality of input samples; and a computing unit configured to convert an input value of activation function computation to an output value using the approximation table retained by the retaining unit when the activation function is selected for the activation function computation. The plurality of input samples of the approximation table are set such that input samples more distant from a reference point in the domain of the activation function have a larger neighboring sample interval.

16 Claims, 13 Drawing Sheets

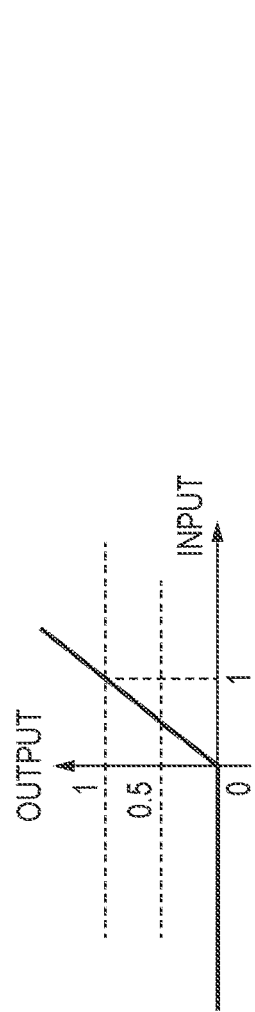
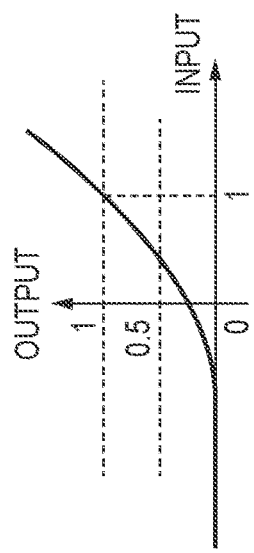
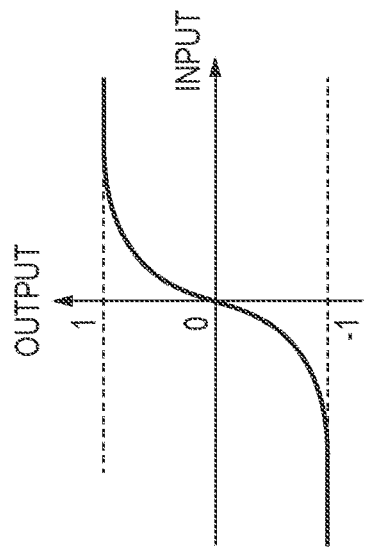
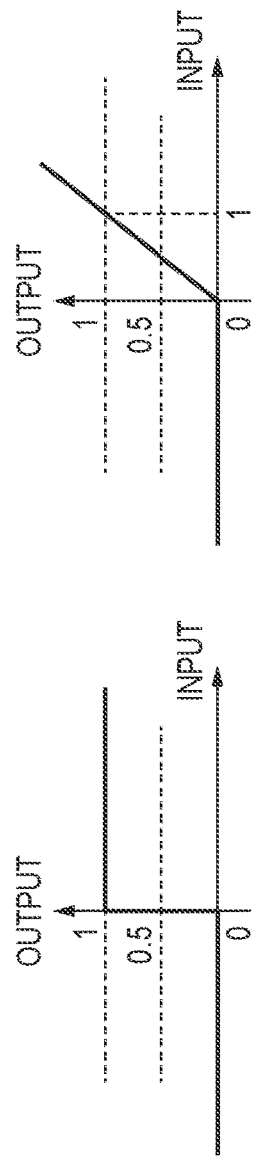
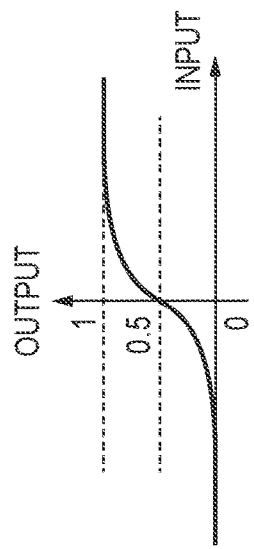

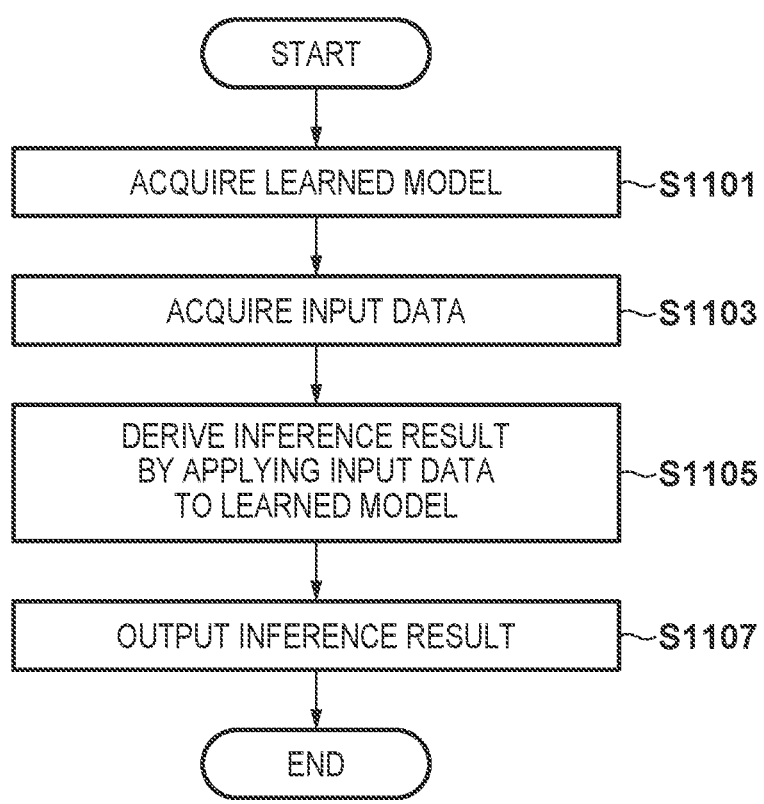

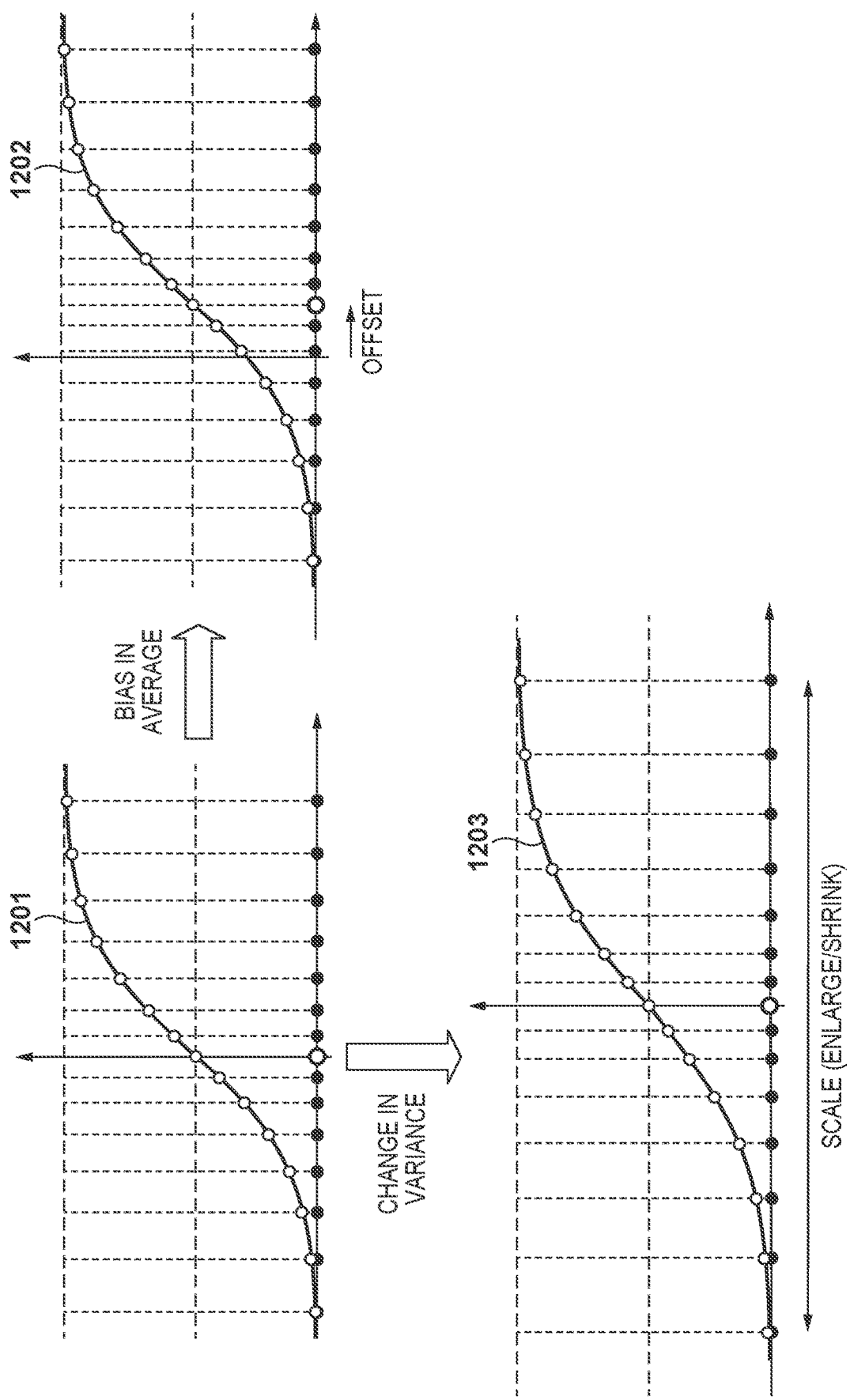

COMPUTING APPARATUS, COMPUTING METHOD, STORAGE MEDIUM, AND TABLE GENERATING APPARATUS

BACKGROUND OF THE INVENTION

Field of the Invention

The present disclosure relates to a computing apparatus, a computing method, a storage medium, and a table generating apparatus.

Description of the Related Art

In a neural network, a node (neuron) of an intermediate layer receives a plurality of signal values from a preceding input or intermediate layer. The node inputs a sum of a weighted sum of those signal values and a bias to an activation function and derives an output value of the node through activation function computation. The activation function is also called a transfer function. Using a non-linear function as the activation function enables a neural network consisting of multiple layers to represent a wide variety of mathematical models that would not be represented by a single-layered network. The activation function is also used at an output layer of a neural network.

There are different kinds non-linear functions used as the activation function. Each of such non-linear functions has an advantage and a disadvantage, and selection is made taking factors into consideration such as nature of a treated problem, easiness for convergence, avoidance of possible vanishing gradient, or computational efficiency, for example. Computational loads of some non-linear functions (for example, a step function and a ReLU function) are low while computational loads of some non-linear functions (for example, a sigmoid function and a tanh function) are relatively high.

Japanese Patent Laid-Open No. H6-175999 discloses a technique to approximately realizing a sigmoid function using discrete sample values retained by a sigmoid function table in order to mitigate a load of sigmoid function computation at a neuron.

SUMMARY OF THE INVENTION

However, the technique disclosed in Japanese Patent Laid-Open No. H6-175999 will result in a lower approximation accuracy and impair reproducibility of a shape of function if the number of samples is small because the domain of the sigmoid function is segmented into uniform segments. Though a sufficient approximation accuracy over the entire domain can be secured by increasing the number of samples, it leads to a waste of memory resources as an unnecessarily large number of samples are assigned in a region where a slope of the function does not change so much.

In light of the foregoing, it is desired to provide a mechanism that makes it possible to perform activation function computation while making more efficient use of resources.

According to an aspect, there is provided a computing apparatus that includes: a retaining unit configured to retain an approximation table that approximately represents an activation function of a neural network, the approximation table mapping between a plurality of discrete input samples of the activation function and output samples respectively corresponding to the plurality of input samples; and a computing unit configured to convert an input value of activation function computation to an output value using the approximation table retained by the retaining unit when the activation function is selected for the activation function computation. The plurality of input samples of the approximation table are set such that input samples more distant from a reference point in the domain of the activation function have a larger neighboring sample interval.

According to another aspect, there is provided a table generating apparatus that includes a receiving unit configured to receive a designation of an activation function of a neural network; and a generation unit configured to generate an approximation table that approximately represents the designated activation function, the approximation table mapping between a plurality of discrete input samples of the activation function and output samples respectively corresponding to the plurality of input samples. The generation unit is configured to set the plurality of input samples of the approximation table such that input samples more distant from a reference point in the domain of the activation function have a larger neighboring sample interval.

Further features of the present invention will become apparent from the following description of exemplary embodiments (with reference to the attached drawings).

BRIEF DESCRIPTION OF THE DRAWINGS

FIG. 2A is an explanatory diagram illustrating an example of an activation function;

FIG. 2B is an explanatory diagram illustrating another example of an activation function;

FIG. 2C is an explanatory diagram illustrating another example of an activation function;

FIG. 2D is an explanatory diagram illustrating another example of an activation function;

FIG. 2E is an explanatory diagram illustrating another example of an activation function;

FIG. 11 is a flowchart illustrating an example of a flow of an inference process according to an embodiment;

FIG. 12 is an explanatory diagram for describing an adjustment of input sample values in a unit of mini-batch according to an alteration example.

DESCRIPTION OF THE EMBODIMENTS

Figure 1:
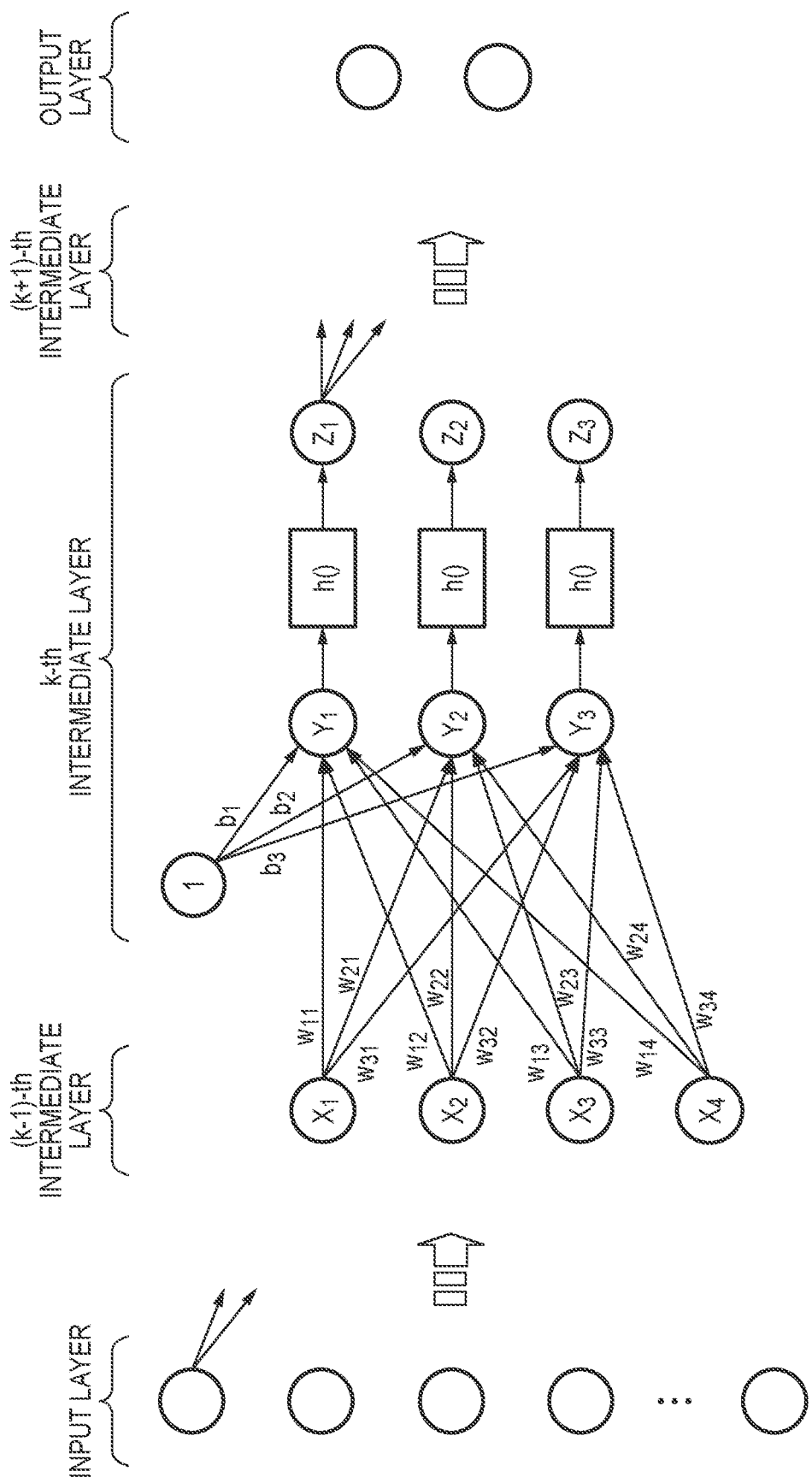
FIG. 1 an explanatory diagram for describing computation performed at a node of a neural network.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

1. Overview

<1-1. Activation Function>

FIG. 1 is an explanatory diagram for describing computation performed at a node of a neural network for machine learning. In general, a neural network consists of an input layer, a plurality of intermediate layers and an output layer. The input layer is a layer that receives data for learning. The k-th intermediate layer consists of $N_k$ nodes ($N_k$ may be different between layers). The k-th intermediate layer receives $N_{k-1}$ signal values $X_m$ (m=1, ..., $N_{k-1}$) from $N_{k-1}$ nodes of the preceding input or intermediate layer, and derives $N_k$ output values Zn (n 1, ..., $N_k$) to forward them to the subsequent layer. FIG. 1 illustrates an example where the (k−1)-th intermediate layer has four nodes ($N_{k-1}$=4) and the k-th intermediate layer has three nodes ($N_k$=3). In particular, the n-th node of the k-th intermediate layer receives four signal values $X_1$, $X_2$, $X_3$ and $X_4$ from the four nodes of the (k−1)-th intermediate layer. Then, the n-th node calculates a weighted sum of the signal values using weights $w_{n1}$, $w_{n2}$, $w_{n3}$ and $w_{n4}$, and further adds biases $b_n$ to derive intermediate values $Y_n$. Such derivation of intermediate values $Y_n$ may be called neuron computation, and represented as the following expression (1) or (2):

$$(X_1\ X_2\ X_3\ X_4)\begin{pmatrix} w_{11} & w_{21} & w_{31} \\ w_{12} & w_{22} & w_{32} \\ w_{13} & w_{23} & w_{33} \\ w_{14} & w_{24} & w_{34} \end{pmatrix} + (b_1\ b_2\ b_3) \rightarrow (Y_1\ Y_2\ Y_3) \quad (1)$$

$$\left.\begin{array}{l} Y_1 = X_1 \cdot w_{11} + X_2 \cdot w_{12} + X_3 \cdot w_{13} + X_4 \cdot w_{14} + b_1 \\ Y_2 = X_1 \cdot w_{21} + X_2 \cdot w_{22} + X_3 \cdot w_{23} + X_4 \cdot w_{24} + b_2 \\ Y_3 = X_1 \cdot w_{31} + X_2 \cdot w_{32} + X_3 \cdot w_{33} + X_4 \cdot w_{34} + b_3 \end{array}\right\} \quad (2)$$

Next, the n-th node inputs each intermediate value $Y_n$ to an activation function h( ) as an argument, and derives an output value $Z_n$ through the activation function computation as in the following expression (3). The activation function is, typically, a single-input and single-output function.

$$\left.\begin{array}{l} Z_1 = h(Y_1) \\ Z_2 = h(Y_2) \\ Z_3 = h(Y_3) \end{array}\right\} \quad (3)$$

FIGS. 2A to 2E illustrate some examples of an activation function. The step function illustrated in FIG. 2A outputs "1" in a case of an input value being larger than a threshold ("0" in the figure) and "0" in a case of an input value being smaller than the threshold. The ReLU (Rectified Linear Unit) function illustrated in FIG. 2B, which is also called a ramp function, outputs a value proportional to an input value in a case of the input value being larger than a threshold ("0" in the figure) and "0" in a case of an input value being smaller than the threshold. The sigmoid function illustrated in FIG. 2C is a monotonically increasing continuous function with a single inflection point that outputs a value which traces an asymptote approaching "0" as an input value gets smaller and traces an asymptote approaching "1" as the input value gets larger. As an example, the following expression (4) is a mathematical expression of a standard sigmoid function:

$$\varsigma(x) = \frac{1}{1+e^{-x}} \quad (4)$$

The tanh (hyperbolic tangent) function illustrated in FIG. 2D is a monotonically increasing continuous function with a single inflection point, similar to the sigmoid function, but its output value traces an asymptote approaching "−1" instead of "0" as an input value gets smaller. The softpuls function illustrated in FIG. 2E is a monotonically increasing continuous function tracing a smoothed locus relative to that of the ReLU function. As understood from FIGS. 2A to 2E, most of the activation functions have a nature that they trace a distinctive locus in the vicinity of a specific point in the domain (the origin in the case of the sigmoid function in FIG. 2C) and that each locus approaches or coincides with a straight line as they tend to infinity.

<1-2. Basic Idea>

Each of the non-linear functions has an advantage and a disadvantage in connection with a design of a neural network model, and selection is made taking factors into consideration such as nature of a treated problem, easiness for convergence, avoidance of possible vanishing gradient, or computational efficiency, for example. Among the non-linear functions illustrated in FIGS. 2A to 2E, the step function and the ReLU function consume less computational resources for computation since they are linear when looking at each segment. Meanwhile, the sigmoid function, the tanh function and the softplus function consume relatively more computational resources for their computation.

Especially when using a non-linear function that tends to consume more computational resources, in order to mitigate load, it would be considered to prepare a table approximately representing the non-linear function in advance and to use it as a lookup table for converting an input value to an output value as a result of computation. In a case where there is no discrete input sample corresponding to the input value, the output value can be derived by interpolation based on sample values at both end of a segment corresponding to the input value. In this method, in a case where the domain of the non-linear function is segmented into uniform segments (neighboring sample intervals are uniform), approximation accuracy deteriorates and reproducibility of a shape of function is impaired if the number of samples is small. Though a sufficient approximation accuracy over the entire domain can be secured by increasing the number of samples, it leads to a waste of memory resources as an unnecessarily large number of samples are assigned in a region where the slope does not change so much.

Therefore, embodiments of the present disclosure described in detail from the next section introduce an approximation table which is set such that input samples more distant from a reference point in the domain of an activation function have a larger neighboring sample interval. In this way, it is expected that resources of an apparatus can be utilized more efficiently when performing activation function computation.

2. Configuration Examples of Apparatuses

<2-1. Hardware Configuration>

Figure 3:
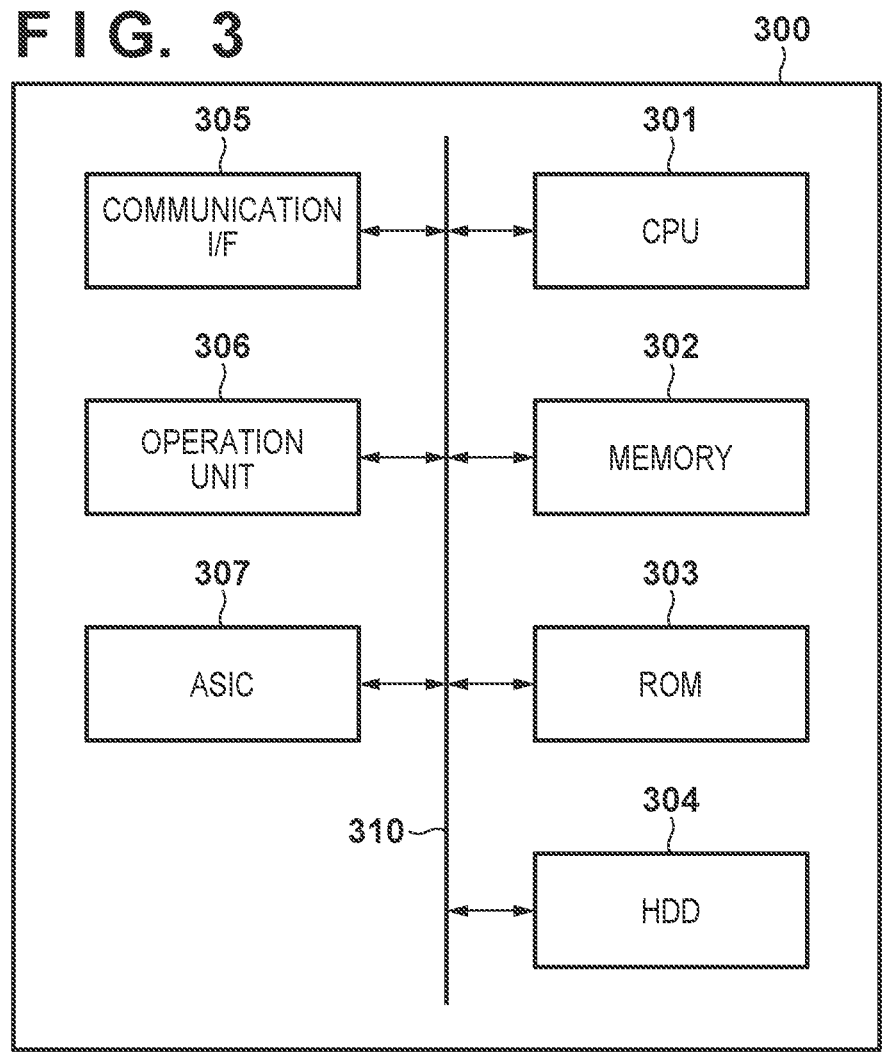
FIG. 3 is a block diagram illustrating an example of a hardware configuration of a computer according to an embodiment.

FIG. 3 is a block diagram illustrating an example of a hardware configuration of a computer in which the technology according to the present disclosure may be implemented. The computer 300 illustrated in FIG. 3 includes a CPU 301, a memory 302, a ROM 303, an HDD 304, a communication I/F 305, an operation unit 306, an ASIC 307 and a bus 310.

The CPU (Central Processing Unit) 301 is a processor that controls overall operation of the computer 300. The memory 302 may be a main memory device for the CPU 301, and provides a temporary work memory area to the CPU 301. The ROM (Read Only Memory) 303 is a nonvolatile memory, and stores computer programs executed by the CPU 301 and related data. The HDD (Hard Disk Drive) 304 is a secondary storage device and stores various data that depends on use of the computer 300. The communication interface (I/F) 305 is an interface for the computer 300 to communicate with other apparatuses. The operation unit 306 is a unit including an input device that receives a command and an information input to the computer 300 from a user, and an output device that outputs information toward a user. The input device may include one or more of a keyboard, a mouse, a touch sensor, a keypad, and a button, for example. The output device may include a display and a speaker, for example. The ASIC (Application Specific Integrated Circuit) 307 is a processing circuit dedicated to processing that is related to machine learning, and is capable of high-speed parallel execution of a huge number of arithmetic computations of the same type, for example. The neuron computation (matrix computation) and the activation function computation described using FIG. 1 may be implemented in software executed by the CPU 301, or may be implemented in a hardware logic of the ASIC 307. The bus 310 is a signal line that interconnects the CPU 301, the memory 302, the ROM 303, the HDD 304, the communication I/F 305, the operation unit 306, and the ASIC 307.

In an aspect, the computer 300 may be utilized as a table generating apparatus for generating an approximation table of the activation function according to the embodiment. In another aspect, the computer 300 may be utilized as a learning apparatus that carries out machine learning using the approximation table of the activation function according to the embodiment. In yet another aspect, the computer 300 may be utilized as an inference apparatus that uses the approximation table of the activation function according to the embodiment when deriving a certain inference result from a learned model. The table generating apparatus, the learning apparatus and the inference apparatus may be respective separate apparatuses, or two or more of those apparatuses may be implemented as a physically-identical apparatus. Examples of specific configurations of respective apparatuses will be described in turns below.

<2-2. Table Generating Apparatus>

Figure 4:
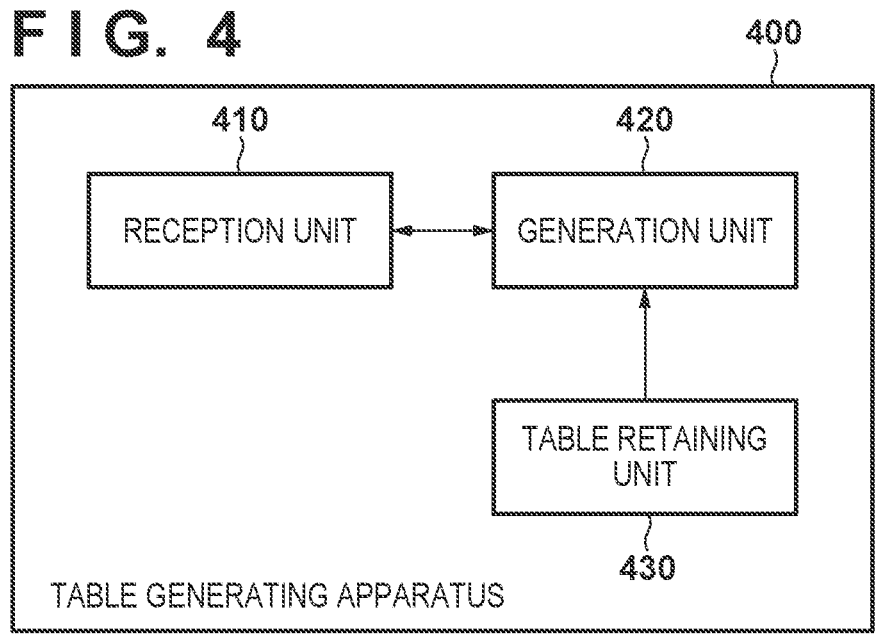
FIG. 4 is a block diagram illustrating an example of a functional configuration of a table generating apparatus according to an embodiment.

FIG. 4 is a block diagram illustrating an example of a functional configuration of a table generating apparatus 400 according to an embodiment. Referring to FIG. 4, the table generating apparatus 400 includes a reception unit 410, a generation unit 420, and a table retaining unit 430.

The reception unit 410 receives a designation of an activation function of a neural network for which an approximation table is generated. The reception unit 410 may, for example, display some default activation functions on a screen of the operation unit 306, and receive a user input designating one of those activation functions via an input device. The reception unit 410 may receive a designation of an activation function via the communication V/F 305. The reception unit 410 may also receive a designation of a user-defined unique activation function by causing the user to input a mathematical expression of the activation function, for example.

The generation unit 420 generates an approximation table that approximately represents the activation function of which designation has been received by the reception unit 410. The approximation table herein is a table that defines mappings between a plurality of discrete input samples of the designated activation function and output samples respectively corresponding to those input samples. In particular, in the present embodiment, the generation unit 420 sets the plurality of input samples of the approximation table such that input samples more distant from a reference point in the domain of the activation function have a larger neighboring sample interval. As an example, the generation unit 420 may set the reference point at the origin of the domain. As another example, the generation unit 420 may set the reference point at a point at which an absolute value of a slope of the activation function will be locally maximal.

Figure 7:
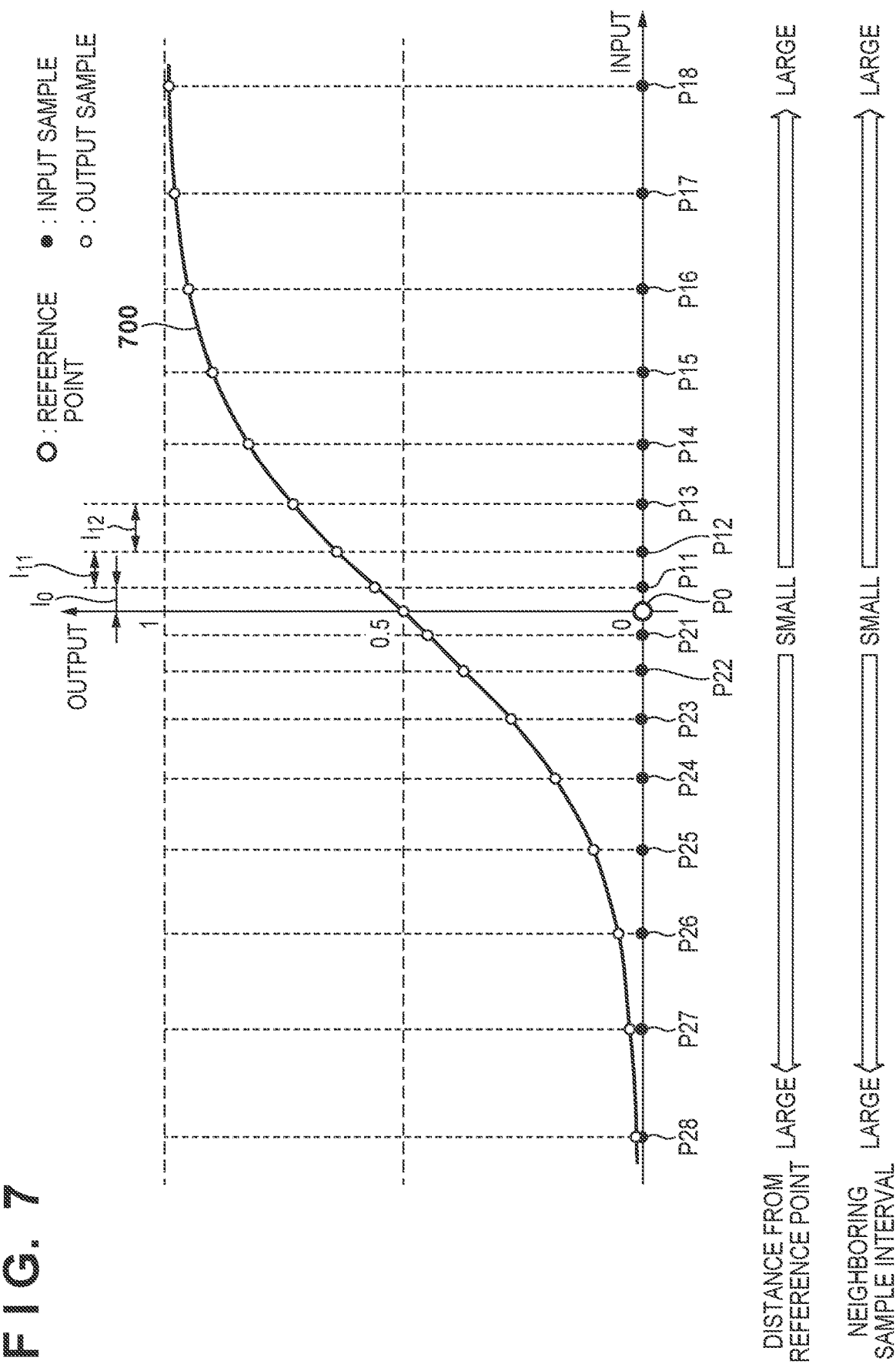
FIG. 7 is an explanatory diagram for describing an example of a technique to generate an approximation table.

FIG. 7 is an explanatory diagram for describing an example of a technique to generate the approximation table. In FIG. 7, a sigmoid curve 700 is illustrated as an example. The horizontal axis of FIG. 7 corresponds to the domain of the sigmoid curve 700 and the vertical axis corresponds to the codomain.

The point P0, which indicates an input value of zero, is the origin of the domain. If an input sample is at the point P0, the corresponding output sample will be 0.5. The sigmoid curve 700 has its maximum slope at the point P0. Thus, the generation unit 420 may set a reference point at the point P0. Then, the generation unit 420 sets a basic sample interval. In the example of FIG. 7, the basic sample interval is equal to the interval between the point P0 and the point P11 which is the right neighbor of the point P0 and the interval between the point P0 and the point P21 which is the left neighbor of the point P0. For example, the basic sample interval may be a preset fixed value (for example, 0.3). Alternatively, the generation unit 420 may set the basic sample interval based on a value of the second derivative of the activation function at the reference point. The second derivative of the activation function represents local rate of change in slope of the activation function. If this rate of change is equal to zero, the activation function is locally linear, and thus approximation accuracy assuming linear interpolation will not deteriorate so much even in a case where a large sample interval is set. If the absolute value of the rate of change in slope gets larger, the activation function will lose linearity to a larger extent, and thus approximation accuracy will deteriorate unless a narrower sample interval is set. Hence, the larger the absolute value of the second derivative value of the activation function at the reference point, the smaller the generation unit 420 may set the basic sample interval, which can secure sufficient approximation accuracy near the reference point.

Next, the generation unit 420 sets the other neighboring sample intervals using the basic sample interval set as a baseline. As an example, the generation unit 420 may set the neighboring sample intervals such that the neighboring sample intervals increase by a constant ratio or a constant increment with increasing distance from the reference point. In the case of increasing the neighboring sample intervals by a constant ratio, the generation unit 420 can calculate the neighboring sample interval at i samples away from the basic sample interval by multiplying the basic sample interval by a ratio r (r>1) i times. For example, let the basic sample interval be $I_0$. The interval $I_1$ between the point P11 and the point P12 in FIG. 7 will be $I_0 \times r$, the interval $I_{12}$ between the point P12 and the point P13 will be $I_0 \times r^2$, and so forth. In this case, looking at one side of the reference point, the sequence of the neighboring sample intervals will be a geometric progression. In the case of increasing the neighboring sample intervals by a constant increment, the generation unit 420 can calculate the neighboring sample interval at i samples away from the basic sample interval by adding a difference d (d>0) i times to the basic sample interval. For example, let the basic sample interval be $I_0$. The interval $I_{11}$ between the point P11 and the point P12 in FIG. 7 will be $I_0+r$, the interval 112 between the point P12 and the point P13 will be $I_0+2r$, and so forth. In this case, looking at one side of the reference point, the sequence of the neighboring sample intervals will be an arithmetic progression. In a case where a slope of the activation function rapidly approaches or coincides with a constant value, the number of samples can be reduced to save memory resources by setting the neighboring sample intervals as a geometric progression instead of an arithmetic progression (or vice versa).

When the generation unit 420 sets a plurality of input samples in the domain of the activation function with the neighboring sample intervals that have been set as a geometric progression or an arithmetic progression, it may verify that an amount of change in a slope of the activation function in a segment between neighboring input samples that have been set does not exceed a threshold. If an amount of change in a slope of the activation function in a segment exceeds the threshold, it means that the approximation accuracy deteriorates in that segment. In this case, the generation unit 420 may reconfigure the ratio r of the geometric progression or the difference d of the arithmetic progression to be a smaller value to narrow the neighboring sample intervals, for example. Conversely, if the amount of change in a slope of the activation function is below the threshold in every segment, the generation unit 420 may reconfigure the ratio r of the geometric progression or the difference d of the arithmetic progression to be a larger value to enlarge the neighboring sample intervals, for example. The generation unit 420 may further adjust the number of input samples depending on the adjustment of the neighboring sample intervals. In the example of FIG. 7, in addition to the reference point P0, eight input sample points P11 to P18 for positive inputs and eight input sample points P21 to P28 for negative inputs are set.

Alternatively, the generation unit 420 may set not only the basic sample interval but also the other neighboring sample intervals based on a value of the second derivative of the activation function. In this case, the interval $I_{11}$ between the point P11 and the point P12 may be set based on the absolute value of the second derivative value of the activation function at the point P11, and the interval $I_{12}$ between the point P12 and the point P13 may be set based on the absolute value of the second derivative value of the activation function at the point P12. A yet another technique may be that the generation unit 420 causes a user to individually designate one or both of the basic sample intervals and the other neighboring sample intervals.

After setting the plurality of input samples in the domain of the activation function in the above-described way, the generation unit 420 calculates each corresponding output sample by inputting each of the set input samples to the activation function. Then, the generation unit 420 generates the approximation table that defines mappings between the multiple discrete input samples and output samples respectively corresponding to those input samples. Table 1 below shows an example of input and output samples of the input sample points P28 to P21, P2 and P1 to P18 of FIG. 7 where the basic sample width is set to 0.3 and the neighboring sample intervals are set as an arithmetic progression with difference d being 0.3.

TABLE 1

Example of Input and Output Samples of Approximation Table for Sigmoid Function

| INPUT SAMPLE POINT | NEIGHBORING SAMPLE INTERVAL | INPUT SAMPLE VALUE | OUTPUT SAMPLE VALUE |
|---|---|---|---|
|  | 2.7 | −13.5 | 0.0000 |
| P28 | 2.4 | −10.8 | 0.0000 |
| P27 | 2.1 | −8.4 | 0.0002 |
| P26 | 1.8 | −6.3 | 0.0018 |
| P25 | 1.5 | −4.5 | 0.0110 |
| P24 | 1.2 | −3.0 | 0.0474 |
| P23 | 0.9 | −1.8 | 0.1419 |
| P22 | 0.6 | −0.9 | 0.2891 |
| P21 | 0.3 | −0.3 | 0.4256 |
| P0 |  | 0.0 | 0.5000 |
| P11 | 0.3 | 0.3 | 0.5744 |
| P12 | 0.6 | 0.9 | 0.7109 |
| P13 | 0.9 | 1.8 | 0.8581 |
| P14 | 1.2 | 3.0 | 0.9526 |
| P15 | 1.5 | 4.5 | 0.9890 |
| P16 | 1.8 | 6.3 | 0.9982 |
| P17 | 2.1 | 8.4 | 0.9998 |
| P18 | 2.4 | 10.8 | 1.0000 |
|  | 2.7 | 13.5 | 1.0000 |

The generation unit 420 sequentially generates respective pairs of input samples and output samples as indicated in the third and fourth columns of Table 1 as entries of the approximation table (the first and second columns may not be included in the approximation table). Herein, when looking at the first two entries in Table 1, the input sample values of these entries are different while the output sample values are equal to each other. This means that the slope of the approximated sigmoid function will be constant (the slope is zero in the example of Table 1) when the input sample value is below −10.8. Similarly, the last two entries in Table 1 indicates that the slope of the approximated sigmoid function will be constant when the input sample value is above +10.8. Such entries of outermost input samples in the approximation table make it possible to derive an output value by linear extrapolation based on the outermost two entries when the input value is located outside the outermost input sample. The approximation table may have a field indicative of a slope of the approximated sigmoid function in each segment corresponding to each input sample, as seen in Table 2 below. The SLOPE field may be utilized, when performing linear interpolation during activation function computation, in order to omit processing to calculate a slope from two sample values of two entries.

TABLE 2

Example of Input and Output Samples and Slope of Approximation Table for Sigmoid Function

| INPUT SAMPLE POINT | NEIGHBORING SAMPLE INTERVAL | INPUT SAMPLE VALUE | OUTPUT SAMPLE VALUE | SLOPE |
|---|---|---|---|---|
| P28 | 2.4 | −10.8 | 0.0000 | 0.0000 |
| P27 | 2.1 | −8.4 | 0.0002 | 0.0008 |
| P26 | 1.8 | −6.3 | 0.0018 | 0.0051 |
| P25 | 1.5 | −4.5 | 0.0110 | 0.0243 |
| P24 | 1.2 | −3.0 | 0.0474 | 0.0787 |
| P23 | 0.9 | −1.8 | 0.1419 | 0.1636 |
| P22 | 0.6 | −0.9 | 0.2891 | 0.2275 |
| P21 | 0.3 | −0.3 | 0.4256 | 0.2481 |
| P0 |  | 0.0 | 0.5000 |  |
| P11 | 0.3 | 0.3 | 0.5744 | 0.2481 |
| P12 | 0.6 | 0.9 | 0.7109 | 0.2275 |
| P13 | 0.9 | 1.8 | 0.8581 | 0.1636 |
| P14 | 1.2 | 3.0 | 0.9526 | 0.0787 |
| P15 | 1.5 | 4.5 | 0.9890 | 0.0243 |
| P16 | 1.8 | 6.3 | 0.9982 | 0.0051 |
| P17 | 2.1 | 8.4 | 0.9998 | 0.0008 |
| P18 | 2.4 | 10.8 | 1.0000 | 0.0000 |

In order to further save memory resources retaining an approximation table, the generation unit 420 may omit generating (or storing) a part of the approximation table as data by exploiting symmetric property of an activation function. For example, the sigmoid function is point-symmetric with respect to the point (0, 0.5). Thus, the generation unit 420 may generate an approximation table consisting only of entries for the input sample points P0 and P1 to P18. The entries for the input sample points P28 to P21 can be generated from the entries for the input sample points P1 to P18 at an apparatus that utilizes the approximation table. Since a tanh function is also point-symmetric with respect to the point (0, 0), data for a part of its approximation table can be omitted. Information regarding symmetric property of an activation function (for example, information that identifies a symmetric point or a symmetry axis) may also be retained.

Figure 8A:
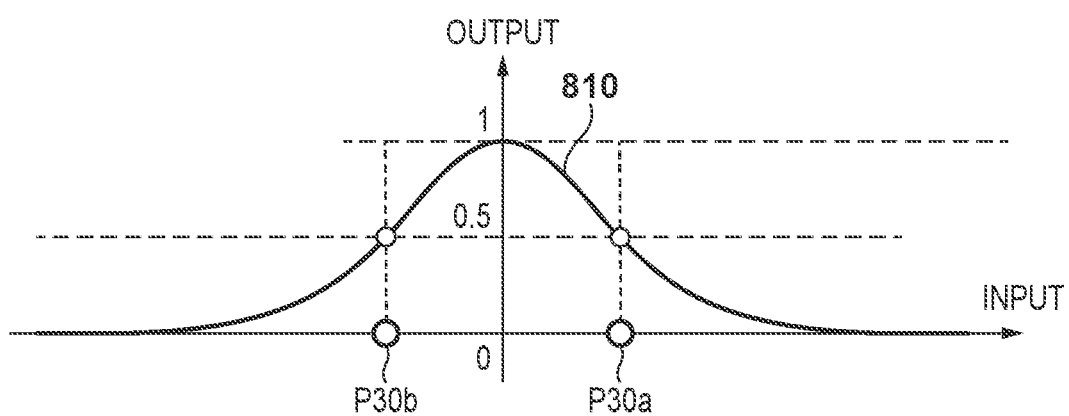
FIG. 8A is a first explanatory diagram for describing an application example of placing a reference point on an activation function.
Figure 8B:
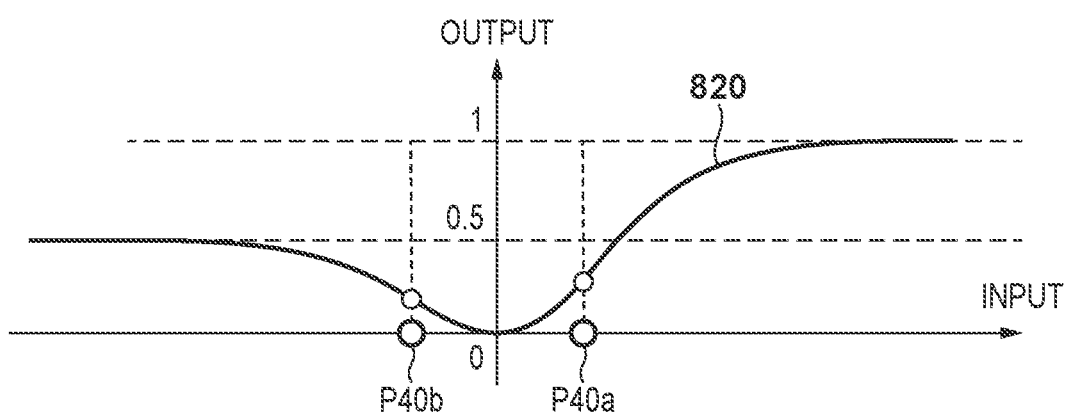
FIG. 8B is a second explanatory diagram for describing an application example of placing a reference point on an activation function.

Though the case where the sigmoid function is selected as an activation function has been mainly described in the above sections, the method for generating the approximation table described above is equally applicable to the other types of activation functions. FIGS. 8A and 8B respectively illustrate examples of activation functions that may be uniquely defined by a user. The activation function curve 810 illustrated in FIG. 8A is line-symmetric with respect to the vertical axis passing through the origin, and indicates the largest output value when the input value is zero. An absolute value of a slope of the activation function curve 810 becomes locally maximal at the points P30a and P30b. In such a case where there are a plurality of local maximal points at which an absolute value of a slope of the activation function is locally maximal, the generation unit 420 may set a plurality of reference points corresponding to the plurality of local maximal points. That is, in the case of FIG. 8A, two reference points may be set respectively to the points P30a and P30b. The neighboring sample intervals may be set such that they are the smallest at or near the reference points P30a and P30b and are larger at positions (for example, the origin) located more distant from these reference points. The activation function curve 820 illustrated in FIG. 8B is neither point-symmetric nor line-symmetric, indicates the smallest output value when the input value is zero, and approaches the line of output value "1" toward positive infinity and the line of output value "0.5" toward negative infinity. An absolute value of a slope of the activation function curve 820 becomes locally maximal at the points P40a and P40b. In this example as well, the generation unit 420 may set a plurality of reference points corresponding to the plurality of local maximal points. That is, in the case of FIG. 8B, two reference points may be set respectively to the points P40a and P40b. The neighboring sample intervals may be set such that they are the smallest at or near these reference points and are larger at positions located more distant from these reference points.

The table retaining unit 430 retains the approximation table of the activation function generated by the generation unit 420 using a storage such as the memory 302 or the HDD 304, for example. The table retaining unit 430 may transmit data of the retained approximation table to another apparatus in response to a request that is received via the operation unit 360 or received via the communication I/F 305.

<2-3. Learning Apparatus>

Figure 5:
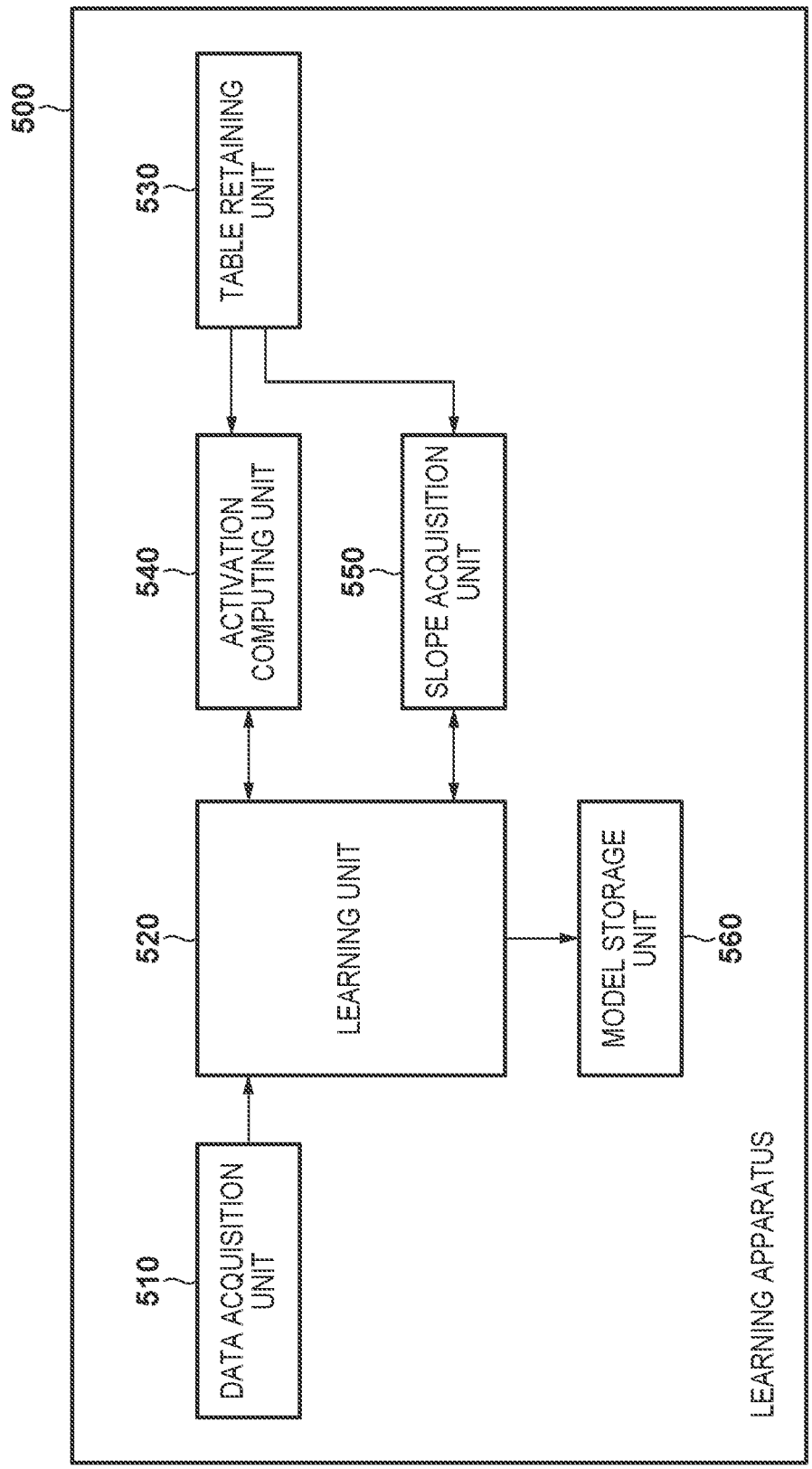
FIG. 5 is a block diagram illustrating an example of a functional configuration of a learning apparatus according to an embodiment.

FIG. 5 is a block diagram illustrating an example of a functional configuration of a learning apparatus 500 according to an embodiment. Referring to FIG. 5, the learning apparatus 500 includes a data acquisition unit 510, a learning unit 520, a table retaining unit 530, an activation computing unit 540, a slope acquisition unit 550 and a model storage unit 560. Though an example where a neural network-based learning is performed as a supervised learning is mainly described herein, it should be noted that the technology according to the present disclosure is equally applicable to unsupervised learning such as an auto-encoder.

The data acquisition unit 510 acquires learning data set utilized in learning process for deriving a learned model. The learning data set includes data for learning input into the input layer of a neural network, and training data which is referred to when evaluating errors of output data. The data acquisition unit 510 outputs the acquired learning data set to the learning unit 520.

The learning unit 520 derives a learned model by performing a learning process using the learning data set acquired by the data acquisition unit 510. For example, the learning unit 520 initializes a model, and then inputs a unit of data for learning to the input layer of a neural network model. Then, the neuron computation and the activation function computation described using FIG. 1 are performed at a plurality of intermediate layers, and output data is derived at the output layer. The learning unit 520 evaluates an error by comparing the output data and the training data, and updates model parameters such as weights and biases so as to reduce the error. The learning unit 520 iterates such a process over several units of data until the learning sufficiently converges. Then, the learning unit 520 outputs a set of finally derived model parameters to the model storage unit 560 as the learned model.

The table retaining unit 530 uses a storage such as the memory 302 or the HDD 304, for example, to retain an approximation table, which approximately represents an activation function of a neural network, generated by the table generating apparatus 400 in advance. The approximation table retained by the table retaining unit 530 is a table that maps a plurality of discrete input samples of an activation function to output samples respectively corresponding to those input samples. The plurality of input samples of the approximation table have been set such that input samples more distant from a reference point in the domain of the activation function have a larger neighboring sample interval. In a case where multiple types of activation functions are utilized in the neural network, the table retaining unit 530 may retain separate approximation tables for those activation functions. However, the table retaining unit 530 may not retain an approximation table for activation functions requiring less computational load such as a step function and a ReLU function.

The activation computing unit 540 is invoked when an activation function approximately represented by an approximation table is selected in the learning process performed by the learning unit 520 and performs activation function computation. Specifically, the activation computing unit 540 converts an input value of activation function computation to an output value using the approximation table which is retained by the table retaining unit 530 for a specific activation function selected for the activation function computation. In a case where the input value is equal to any input sample in the approximation table, the activation computing unit 540 outputs, as an output value, an output sample to which the input sample is mapped. Meanwhile, in a case where the input value is equal to none of input samples in the approximation table, the activation computing unit 540 acquires the minimum input sample above the input value and the maximum input sample below the input value and respective corresponding output samples from the approximation table. Then, the activation computing unit 540 converts the input value to an output value by interpolation based on the acquired two input/output sample pairs. Typically, the interpolation herein may be a simple linear interpolation. An exceptional case is that, in a case where the input value is located in the domain outside the outermost input sample in the approximation table, the activation computing unit 540 may convert the input value to an output value by linear extrapolation based on the outermost two input samples and corresponding output samples. In a case where a slope is given in advance for each of segments set in the domain as described using Table 2, the activation computing unit 540 may derive the output value using the slope. Note that the activation computing unit 540 may derive the output value by curve interpolation such as spline interpolation based on a larger number of input/output sample pairs. Then, the activation computing unit 540 returns the derived output value to the learning unit 520 as a response to the function call.

In a case where the selected activation function is point-symmetric with respect to a symmetric point or line-symmetric with respect to a symmetry axis, the approximation table retained by the table retaining unit 530 may define only sample values in one side of the symmetric point or the symmetry axis in the domain. In this case, the activation computing unit 540 may generate sample values of the activation function in the other side of the symmetric point or the symmetry axis based on sample values defined by the approximation table for use in the activation function computation.

The learning unit 520 determines, when updating model parameters based on an error in output data, to which direction the model parameters should be modified so as to reduce error, by using a technique called "backpropagation". In order to effectively operate the backpropagation, in general, it is necessary that a derivative of the activation function is available. The slope acquisition unit 550 is invoked by the learning unit 520 for backpropagation in a learning process performed by the learning unit 520, and acquires an approximated value of the derivative value of the activation function to return it to the learning unit 520. Specifically, the slope acquisition unit 550 acquires, from the approximation table retained by the table retaining unit 530, the minimum input sample above the input value and the maximum input sample below the input value and respective corresponding output samples. Then, the slope acquisition unit 550 derives a slope between the acquired two input/output sample pairs as an approximated value, corresponding to the input value, of the derivative value of the activation function. In a case where the input value is located in the domain outside the outermost input sample in the approximation table, a slope derived based on the outermost two input samples and corresponding output samples may be used as the approximated value of the derivative value corresponding to the input value. Note that, in a case where a slope is given in advance in the approximation table for each of segments set in the domain as described using Table 2, the slope acquisition unit 550 may acquire one of those slopes without any change and return it to the learning unit 520.

The model storage unit 560 stores, as a learned model, the set of model parameters derived by the learning unit 520 as a result of the above-described learning process, using a storage such as the HDD 304, for example. The learned model may include a parameter that identifies a type of an activation function utilized at each layer of the neural network.

<2-4. Inference Apparatus>

Figure 6:
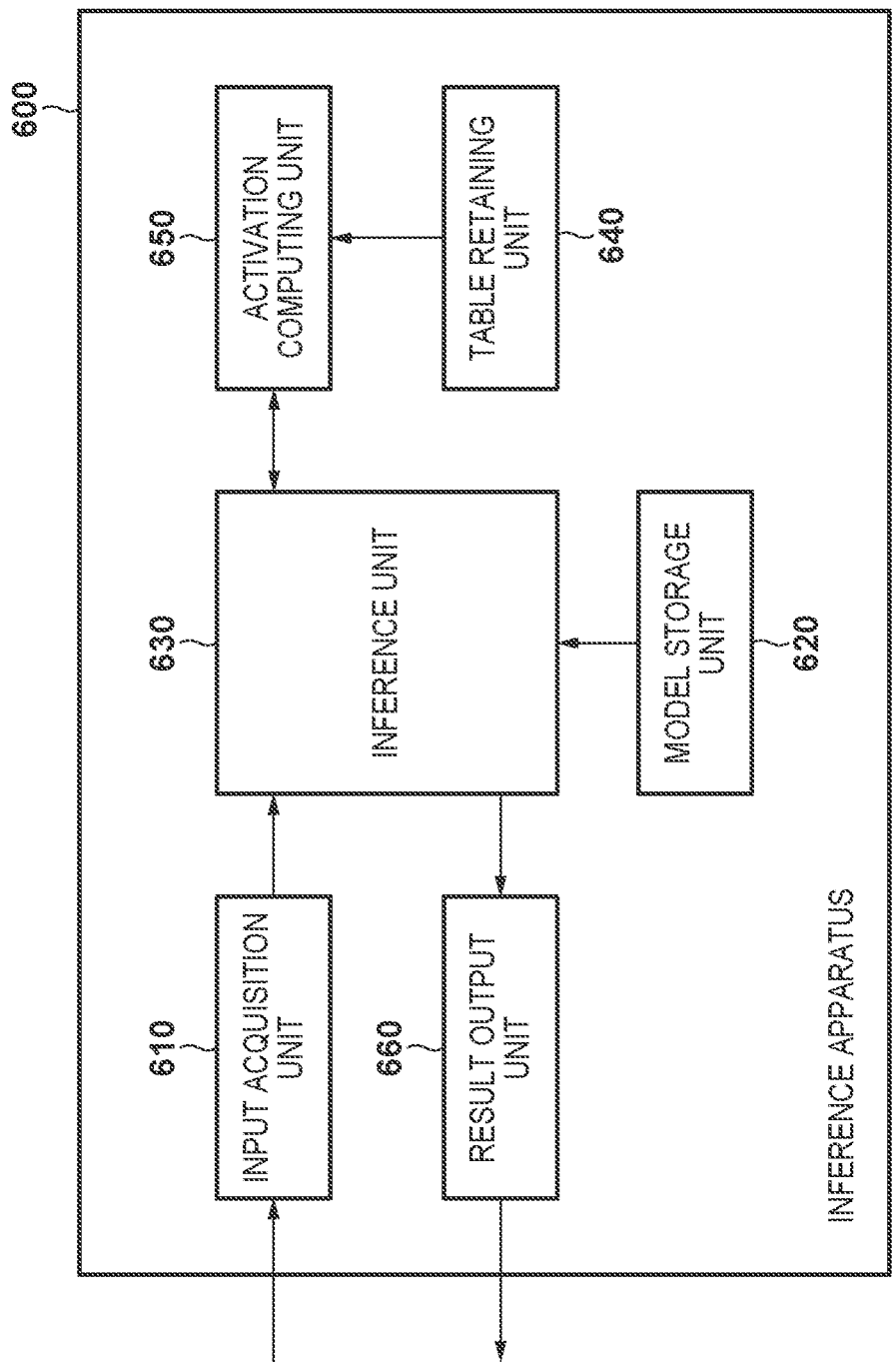
FIG. 6 is a block diagram illustrating an example of a functional configuration of an inference apparatus according to an embodiment.

FIG. 6 is a block diagram illustrating an example of a functional configuration of an inference apparatus 600 according to an embodiment. Referring to FIG. 6, the inference apparatus 600 includes an input acquisition unit 610, a model storage unit 620, an inference unit 630, a table retaining unit 640, an activation computing unit 650 and a result output unit 660.

The input acquisition unit 610 acquires input data to be applied to a learned model for inference. The input data may be data in a form similar to that of a unit of the data for learning that was input to the input layer of the neural network at the time of the learning process. The input acquisition unit 610 outputs the acquired input data to the inference unit 630.

The model storage unit 620 stores the learned model derived by the learning apparatus 500 as a result of the above-described learning process, using a storage such as the HDD 304, for example. The learned model may include a parameter that identifies a type of an activation function utilized at each layer of the neural network. Such a learned model is read out from the model storage unit 620 to the inference unit 630 when an inference process is performed.

The inference unit 630 constructs a learned mode, for example, within the memory 302 in accordance with the parameters of the learned model read out from the model storage unit 620. Next, the inference unit 630 applies input data input from the input acquisition unit 610 to the leaned model to derive an inference result. Then, the inference unit 630 outputs the derived inference result to the result output unit 660.

The table retaining unit 640 uses a storage to retain an approximation table, which approximately represents an activation function of a neural network, generated by the table generating apparatus 400 in advance. The approximation table retained by the table retaining unit 640 is a table that maps a plurality of discrete input samples of an activation function to output samples respectively corresponding to those input samples. The plurality of input samples of the approximation table have been set such that input samples more distant from a reference point in the domain of the activation function have a larger neighboring sample interval. In a case where multiple types of activation functions are utilized in the neural network, the table retaining unit 640 may retain separate approximation tables for those activation functions. However, the table retaining unit 640 may not retain an approximation table for activation functions requiring less computational load such as a step function and a ReLU function.

The activation computing unit 650 is invoked when an activation function approximately represented by an approximation table is selected in the inference process performed by the inference unit 630 and performs activation function computation. Specifically, the activation computing unit 650 converts an input value of activation function computation to an output value using the approximation table which is retained by the table retaining unit 640 for a specific activation function selected for the activation function computation. The way to convert the input value to the output value may be similar to the way described in connection with the activation computing unit 540 of the learning apparatus 500. Then, the activation computing unit 650 returns the derived output value to the inference unit 630 as a response to the function call. Similarly to the activation computing unit 540 of the learning apparatus 500, the activation computing unit 650 may restore the entire approximation table from approximation table data in which some part is omitted by exploiting symmetric property, and use the restored table.

The result output unit 660 outputs (for example, displays, outputs as a speech, or transmit to another apparatus) the inference result input from the inference unit 630 via an output device such as a display of the operation unit 306 or the communication I/F 305, for example.

3. Process Flows

<3-1. Table Generation Process>

Figure 9:
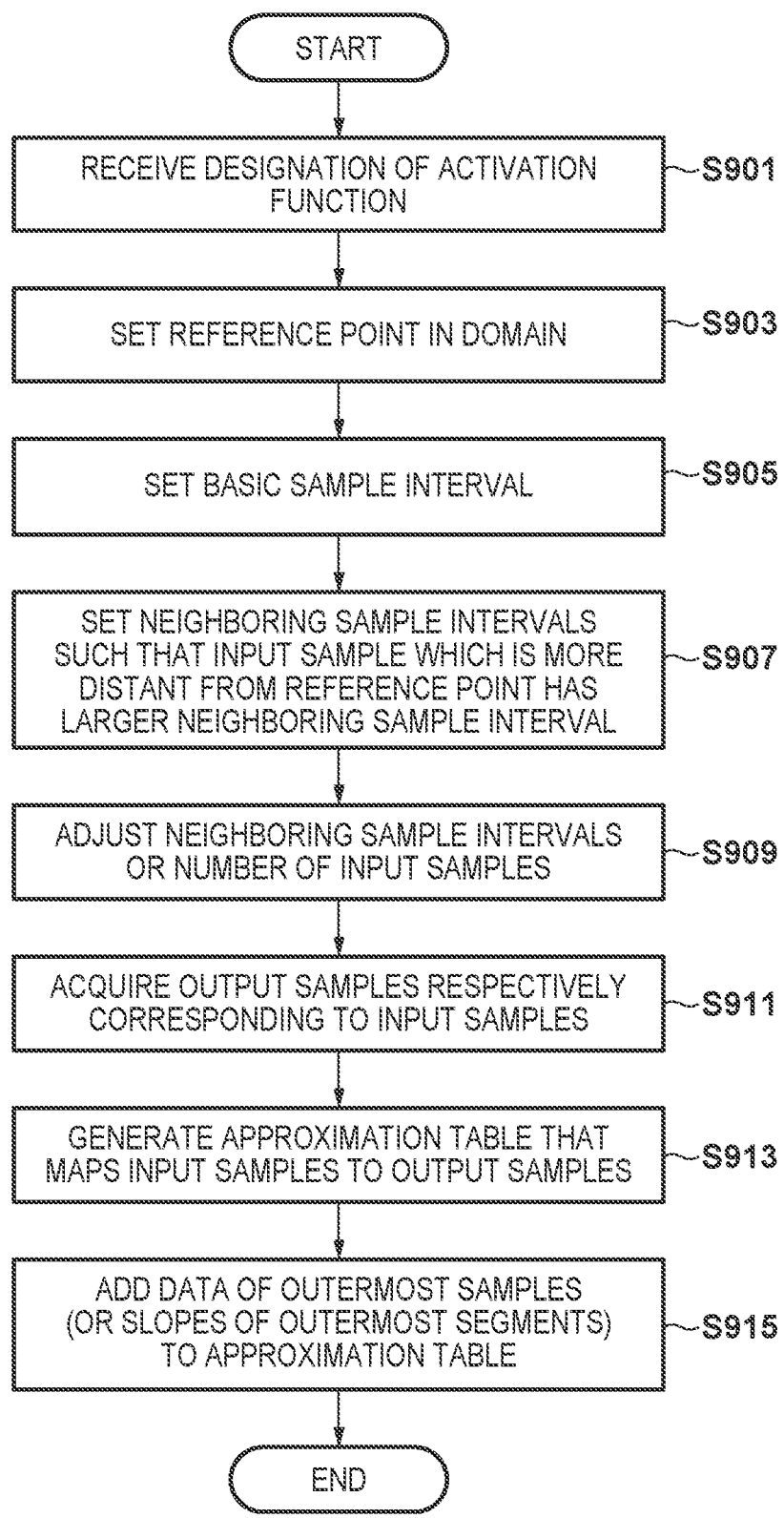
FIG. 9 is a flowchart illustrating an example of a flow of an approximation table generation process according to an embodiment.

FIG. 9 is a flowchart illustrating an example of a flow of an approximation table generation process that may be performed by the table generating apparatus 400 according to the embodiment. The process illustrated in FIG. 9 may be realized by a processor of the table generating apparatus 400 (for example, the CPU 301) executing a computer program loaded to a memory (for example, the memory 302). Note that 'S (Step)' in the following descriptions is an abbreviation of 'process step'.

First, at S901, the reception unit 410 receives a designation of an activation function of a neural network for which an approximation table is to be generated. Next, at S903, the generation unit 420 sets a reference point of the approximation table by, for example, determining a point at which an absolute value of a slope of the designated activation function is locally maximal in the domain of the activation function (or sets it at the origin or a user-designated point). Next, at S905, the generation unit 420 sets a basic sample interval of the approximation table, for example, based on a second derivative value of the activation function at the reference point (or to a predefined or user-designated value). Next, at S907, the generation unit 420 sets neighboring sample intervals for a plurality of input samples such that input samples more distant from the reference point have a larger neighboring sample interval. For example, the generation unit 420 may set the neighboring sample intervals as a geometric progression or an arithmetic progression, or may set them based on second derivative values of the activation function. Next, at S909, the generation unit 420 verifies an amount of change in a slope of the activation function in the segment between neighboring input samples for each neighboring sample interval set at S907 and, if necessary, adjusts the neighboring sample interval or the number of input samples. Next, at S911, the generation unit 420 acquires, through activation function computation, output samples respectively corresponding to input samples having the intervals that have been set at S907 or adjusted at S909. Next, at S913, the generation unit 420 generates an approximation table that maps the plurality of input samples to corresponding output samples. Next, at S915, the generation unit 420 adds values of outermost input samples in the domain and corresponding output samples (or slopes of the outermost segments) to the approximation table. The approximation table generated in this way is retained by the table retaining unit 430 in association with a parameter identifying the type of the activation function, for example.

<3-2. Learning Process>

Figure 10A:
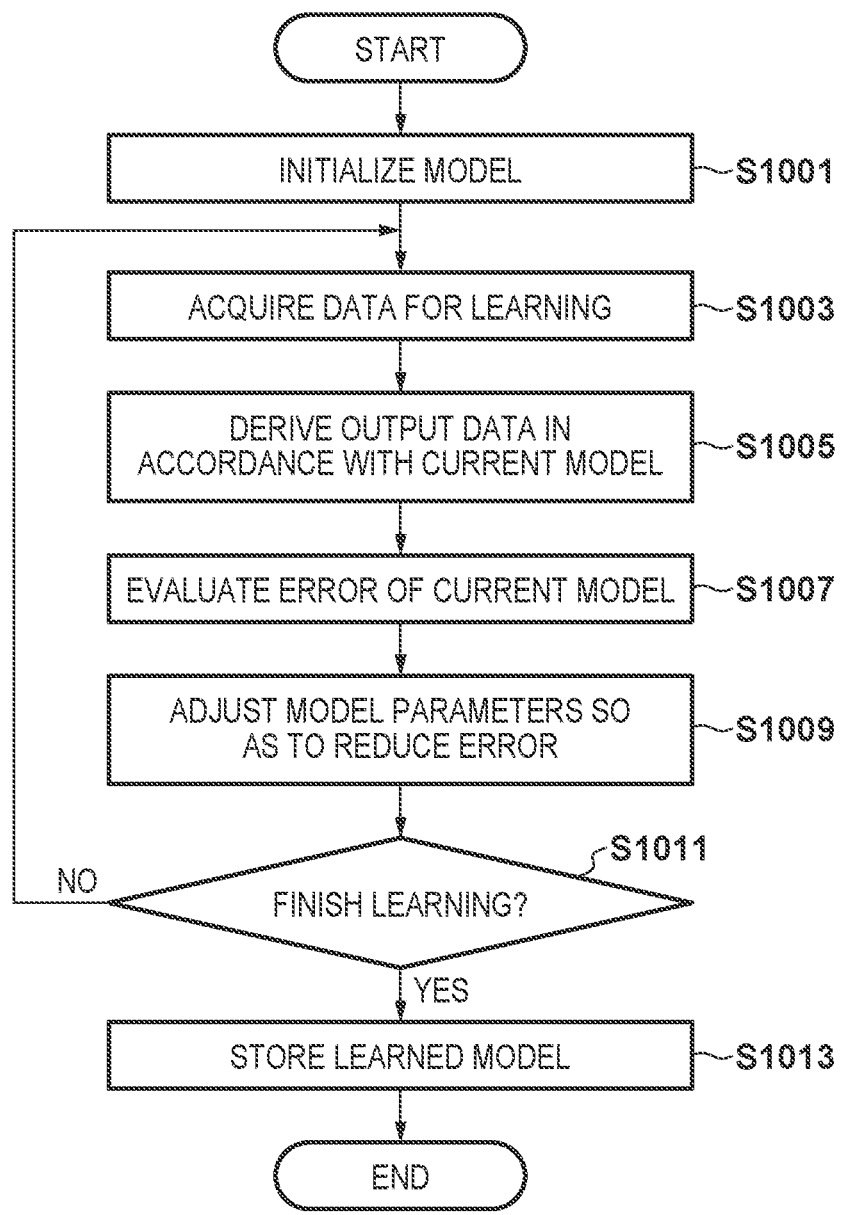
FIG. 10A is a flowchart illustrating an example of a flow of a learning process according to an embodiment.
Figure 10B:
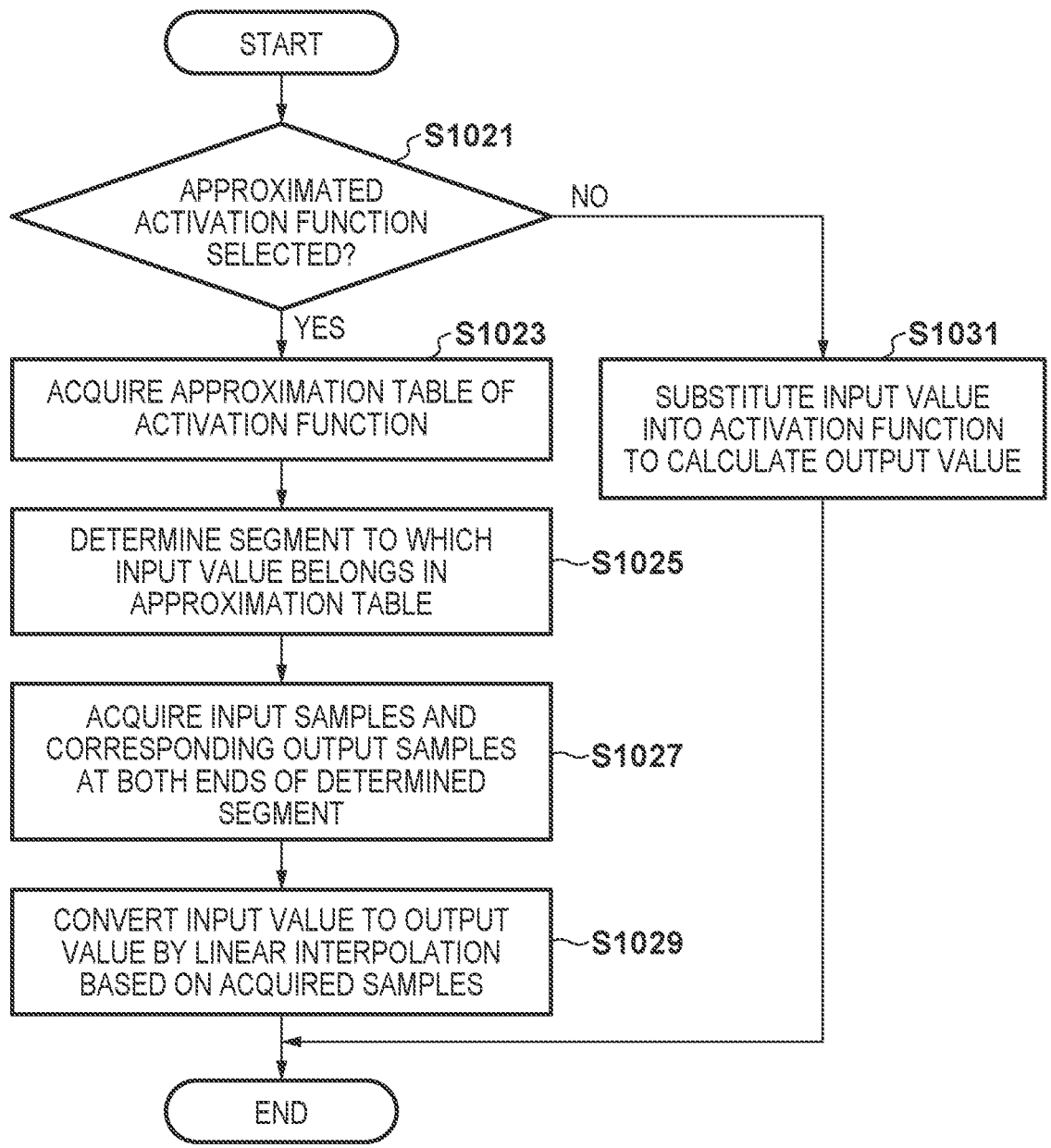
FIG. 10B is a flowchart illustrating an example of a flow of an activation function process included in the learning process of FIG. 10A.

FIG. 10A is a flowchart illustrating an example of a flow of a learning process that may be performed by the learning apparatus 500 according to the embodiment. FIG. 10B is a flowchart illustrating an example of a flow of an activation function process that may be performed as a part of S1005 of FIG. 10A. These processes may be realized by a processor of the learning apparatus 500 (for example, the CPU 301) executing a computer program loaded to a memory (for example, the memory 302). A portion of the processes may be realized as a hardware logic (for example, implemented in the ASIC 307).

In the learning process in FIG. 10A, first, at S1001, the learning unit 520 initializes the neural network model by giving initial values to parameters such as weights and a bias of each layer of the neural network. The rest of the process is iterated for each unit of data for learning included in learning data set acquired by the data acquisition unit 510. In each iteration, at S1003, the learning unit 520 acquires a unit of the data for learning. Next, at S1005, the learning unit 520 inputs the acquired data for learning to the input layer of the neural network, performs various computations at intermediate layers, and derives an output value at the output layer in accordance with the current model. The processing at intermediate layers (and the output layer) may include an activation function process described later. Next, at S1007, the learning unit 520 evaluates an error of the current model by comparing the derived output data with training data. Next, at S1009, the learning unit 520 adjusts the model parameters by backpropagation so as to reduce the evaluated error. In the backpropagation herein, the slope acquisition unit 550 may acquire, as an approximated value of a derivative value of the activation function corresponding to the input value of the activation function, a slope between two input/output sample pairs in the approximation table retained by the table retaining unit 530. Next, at S1011, the learning unit 520 determines whether to finish the learning process or not. For example, the learning unit 520 may determine to finish the learning process when a predetermined amount of data for learning has been processed, or when it determines that the learning has sufficiently converged. In a case of not finishing the learning process, S1003 to S1011 are iterated for next data for learning. In a case of finishing the learning process, at S1013, the learning unit 520 outputs the learned model to the model storage unit 560, and the model storage unit 560 stores the leaned model.

With reference to the activation function process in FIG. 10B, first, at S1021, the learning unit 520 selects an activation function for activation function computation at a certain layer. Herein, if an activation function approximately represented by an approximation table is selected, the process proceeds to S1023, and the learning unit 520 invokes the activation computing unit 540. If an activation function that is not the approximated activation function is selected, the process proceeds to S1031.

At S1023, the activation computing unit 540 acquires the approximation table of the selected activation function from the table retaining unit 530. Herein, in a case where a part of the approximation table is omitted by exploiting symmetric property of the activation function, the entire approximation table may be restored by mirroring entries, for example. Next, at S1025, the activation computing unit 540 determines to which segment out of the segments constituting the approximated activation function (segmented by input samples) the input value input from the learning unit 520 belongs. Next, at S1027, the activation computing unit 540 acquires, from the approximation table, the input samples and corresponding output samples of both ends of the determined segment. Next, at S1029, the activation computing unit 540 converts the input value to an output value by linear interpolation based on the acquired input samples and corresponding output samples. Then, the activation computing unit 540 returns the output value to the learning unit 520.

Meanwhile, at S1031, the learning unit 520 inputs the input value to the selected activation function to calculate an output value of the activation function.

<3-3. Inference Process>

FIG. 11 is a flowchart illustrating an example of a flow of an inference process that may be performed by the inference apparatus 600 according to the embodiment. The process illustrated in FIG. 11 may be realized by a processor of the inference apparatus 600 (for example, the CPU 301) executing a computer program loaded to a memory (for example, the memory 302). A portion of the inference process may be realized as a hardware logic (for example, implemented in the ASIC 307).

First, at S1101, the inference unit 630 acquires the learned model stored in the model storage unit 620, and constructs the learned mode within a memory in accordance with the parameters of the acquired learned model. Next, at S1103, the inference unit 630 acquires, through the input acquisition unit 610, input data to be applied to the learned model. Next, at S1105, the inference unit 630 derives an inference result by applying the acquired input data to the learned model. The computational processing performed at intermediate layers (and the output layer) here may include an activation function process performed by the activation computing unit 650. The flow of the activation function computation may be similar to the flow described using FIG. 10B, and thus the detailed description thereof is herein omitted. Next, at S1107, the inference unit 630 outputs the derived inference result to the result output unit 660.

4. Alteration Examples

If distribution of data values of data for learning varies during a learning process, unstable behavior of the intermediate layers impedes convergence of learning and, in some cases, a desirable learning result cannot be obtained. So-called 'batch normalization' is a known technique to absorb such a variation of distribution to efficiently proceed the learning process. The batch normalization is normally carried out between a neuron computation and activation function computation. During the batch normalization, for example, a variation of distribution of intermediate signal values is determined in a unit of mini-batch corresponding to a predetermined number of iterations of the learning process, and each signal value is adjusted such that the determined variation will be canceled. In this way, the distribution in a unit of mini-batch is normalized and destabilization of the behavior of the intermediate layers is avoided.

In an alteration example of the above-described embodiment, it is possible to substantially embed batch normalization within activation function computation by altering an approximation table of an activation function. The alteration of the approximation table may be achieved by adjusting input sample values of the approximation table so as to cancel the variation of distribution in a unit of mini-batch. Specifically, the activation computing unit 540 calculates, in a unit of mini-batch, an average and a variance of intermediate data (for example, the intermediate values $Y_1$, $Y_2$, $Y_3$ in the example of FIG. 1) processed at an intermediate layer during a learning process. The activation computing unit 540 further determines an offset value for canceling the variation of the average in the unit of mini-batch, and a scaling factor for canceling the variation of the variance in the unit of mini-batch. Then, the activation computing unit 540 offsets (adds the offset value to) and scales (multiplies by the scaling factor) the plurality of input sample values indicated by the approximation table of the activation function.

FIG. 12 is an explanatory diagram for describing an adjustment of input sample values in a unit of mini-batch according to the alteration example. A sigmoid curve 1201 which is similar to the curve 700 shown in FIG. 7 is illustrated at the upper left of FIG. 12 along with the positions of input samples and corresponding output samples set in an approximation table. As a result of adding offset values to the input sample values of the sigmoid curve 1201, the approximation table will represent the adjusted sigmoid curve 1202 illustrated at the upper right of FIG. 12. As can be seen in the figure, for example, the position of the reference point in the curve 1202 has been moved rightward by the offset. As a result of multiplying the input sample values of the sigmoid curve 1201 by a scaling factor, the approximation table will represent the adjusted sigmoid curve 1203 illustrated at the lower left of FIG. 12. As can be seen in the figure, for example, the neighboring sample intervals in the curve 1203 have been enlarged. Enlarging neighboring sample intervals of an approximation table in this way brings about an effect, on the activation function computation using the approximation table, that a variance of signal values is lowered. Conversely, shrinking neighboring sample intervals of an approximation table brings about an effect, on the activation function computation using the approximation table, that a variance of signal values is raised. It will be sufficient that the adjustment of the approximation table is performed once per a mini-batch. Using the adjusted approximation table in this way in activation function computation eliminates the need to perform batch normalization for individual data for learning separately from the activation function computation.

Figure 13:
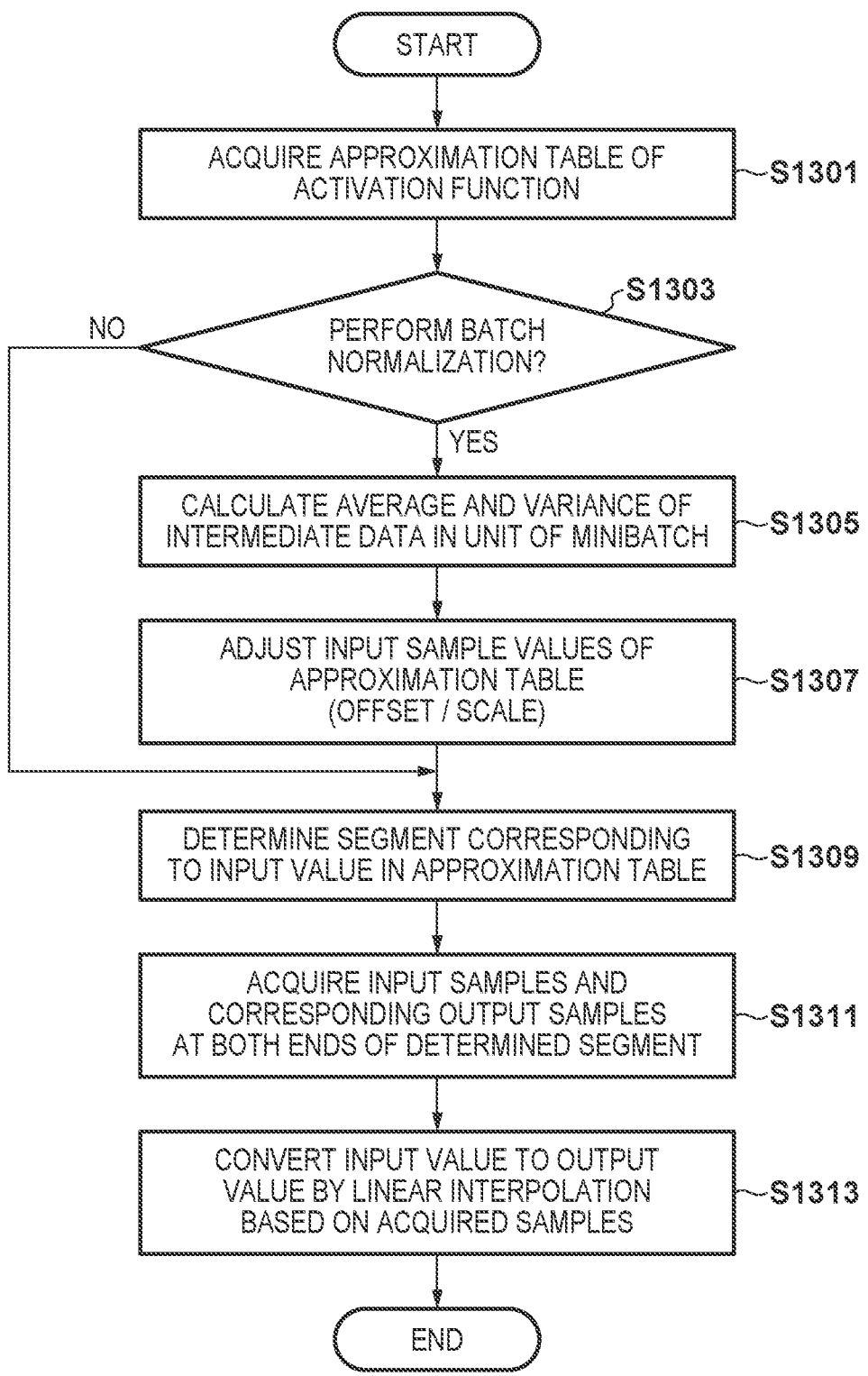
FIG. 13 is a flowchart illustrating an example of a flow of an activation function process according to an alteration example.

FIG. 13 is a flowchart illustrating an example of a flow of an activation function process according to the alteration example. The activation function process may be performed as a part of S1005 of the learning process described using FIG. 10A, for example. The activation function process may be realized by a processor of the learning apparatus 500 (for example, the CPU 301) executing a computer program loaded to a memory (for example, the memory 302). A portion of the process may be realized as a hardware logic (for example, implemented in the ASIC 307).

Herein, it is assumed that an activation function approximately represented by an approximation table has been selected to calculate an output value at a certain layer. First, at S1301, the activation computing unit 540 acquires the approximation table of the activation function from the table retaining unit 530. In a case where a part of the approximation table is omitted by exploiting symmetric property of the activation function, the activation computing unit 540 may restore the entire approximation table by mirroring entries, for example. Next, at S1303, the activation computing unit 540 determines whether to perform batch normalization. For example, the activation computing unit 540 may determine to perform batch normalization at a timing when the iterations of the learning process have reached a predetermined number of times corresponding to a mini-batch. In a case where the activation computing unit 540 determines to perform batch normalization, at S1305, it calculates an average and a variance of intermediate data in a unit of mini-batch. Next, at S1307, the activation computing unit 540 adjusts (offsets/scales) input sample values of the approximation table so as to cancel variations of the average and the variance calculated at S1305. It should be noted that the activation computing unit 540 may adjust input sample values of the approximation table only when the average and the variance of the intermediate data in a unit of mini-batch satisfy a predetermined condition. The predetermined condition herein may be, for example, that the variation of the average exceeds a preset first threshold, or that the variation of the variance exceeds a preset second threshold. The subsequent S1309 to S1313 are similar steps to S1025 to S1029 described using FIG. 108, and thus the detailed description thereof is herein omitted.

5. Conclusion

The embodiments and the alteration examples of the present disclosure have been described above in detail with reference to FIGS. 1 to 13. According to the above-described embodiments, in an approximation table of an activation function of a neural network, a plurality of input samples are set such that input samples more distant from a reference point in the domain of the function have a larger neighboring sample interval. The approximation table is then used to convert an input value of activation function computation to an output value. With this configuration, it is possible to secure sufficient approximation accuracy over the entire domain of the activation function without assigning an unnecessarily large number of samples in a region where a slope does not change so much. As a result, the activation function computation can be performed with a reduced computational load while preventing memory resources from being wasted. Such an advantage of making efficient use of resources of a computing apparatus can be enjoyed not only during a learning stage of performing a learning process utilizing a neural network but also during an inference stage of performing an inference process based on a learned model.

In the above-described embodiments, the input value may be converted to the output value by interpolation based on the minimum input sample above the input value of the activation function computation and the maximum input sample below the input value and respective corresponding output samples. With this configuration, output values of each layer of the neural network can be derived by a simple process of acquisition of sample values from the approximation table and interpolation based on the acquired sample values. In this case, no computation having a high computational load such as exponential computation or logarithm computation is needed.

In the above-described embodiments, for an activation function having symmetric property, the plurality of input samples of the approximation table may be defined in a part of the domain, and the rest of the input samples may be generated at the time of the activation function computation. With this configuration, it is possible to further save memory resources to retain the approximation table.

In the above-described embodiments, the reference point may be automatically set at the origin or a point at which an absolute value of a slope of the activation function is locally maximal. With this configuration, it is possible to enhance density of input samples by narrowing neighboring sample intervals in a region where there is a significant change of the activation function to sufficiently reflect a specific property of the activation function in the approximation table. In a case where there are a plurality of local maximal points at which an absolute value of a slope of the activation function is locally maximal, a plurality of reference points may be set. In this case, it is possible to flexibly generate an appropriate approximation table for a special user-specific activation function, for example.

In the above-described embodiments, the neighboring sample interval may be set based on a value of a second derivative of the activation function. In this case, it is possible to appropriately set the neighboring sample interval so that an amount of change in an output value in any segment between neighboring samples will not become too large and that any neighboring sample interval will not be too small. The neighboring sample intervals may be set such that the intervals increase, from a basic sample interval at the reference point as a baseline, by a constant ratio or a constant increment with increasing distance from the reference point. In this case, the input sample values form a simple geometric progression or arithmetic progression, which allows for easy generation of the approximation table irrespective of the type of the activation function.

In the above-described alteration example, input sample values indicated by the approximation table may be adjusted based on an average or a variance in a unit of mini-batch of intermediate data processed in an intermediate layer of the neural network, and the approximation table after the adjustment may be used. With this configuration, it is possible to stabilize behavior of the intermediate layer to smoothly proceed the learning process without performing batch normalization separately from the activation function computation.

6. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-018209, filed on Feb. 5, 2020 which is hereby incorporated by reference herein in its entirety.

What is claimed is:

1. A computing apparatus comprising:
   a retaining unit configured to retain an approximation table that approximately represents an activation function of a neural network, the approximation table mapping between a plurality of discrete input samples of the activation function and a plurality of output samples, the plurality of output samples respectively corresponding to the plurality of input samples; and
   a computing unit configured to convert an input value of activation function computation to an output value using the approximation table retained by the retaining unit when the activation function is selected for the activation function computation,
   wherein the plurality of input samples of the approximation table are set such that input samples more distant from a reference point in the domain of the activation function have a larger neighboring sample interval, and
   wherein the neighboring sample interval is set such that the neighboring sample interval increases, from a basic sample interval at the reference point as a baseline, by a constant ratio or a constant increment with increasing distance from the reference point.

2. The computing apparatus according to claim 1, wherein, when the input value is not equal to any input sample of the approximation table, the computing unit is configured to convert the input value to the output value by interpolation based on the minimum input sample above the input value and the maximum input sample below the input value and respective corresponding output samples.

3. The computing apparatus according to claim 1, wherein
   the activation function is point-symmetric with respect to a symmetric point or line-symmetric with respect to a symmetry axis,
   the plurality of input samples of the approximation table are defined for one side of the symmetric point or the symmetry axis in the domain, and
   the computing unit is configured to generate sample values of the activation function for the other side of the symmetric point or the symmetry axis based on the approximation table for use in the activation function computation.

4. The computing apparatus according to claim 1, further comprising:
   an inference unit configured to perform an inference process that utilizes the neural network,
   wherein the inference unit is configured to cause the computing unit to perform the activation function computation in the inference process.

5. The computing apparatus according to claim 1, further comprising:
   a learning unit configured to perform a learning process that utilizes the neural network,
   wherein the learning unit is configured to cause the computing unit to perform the activation function computation in the learning process.

6. The computing apparatus according to claim 5, wherein the computing unit is configured to adjust values of the plurality of input samples indicated by the approximation table based on an average or a variance in a unit of mini-batch of intermediate data processed in an intermediate layer of the neural network to use the approximation table after adjustment for the activation function computation.

7. The computing apparatus according to claim 6, wherein the adjustment includes offsetting values of the plurality of input samples based on the average in a unit of mini-batch of the intermediate data.

8. The computing apparatus according to claim 6, wherein the adjustment includes scaling values of the plurality of input samples based on the variance in a unit of mini-batch of the intermediate data.

9. The computing apparatus according to claim 5, further comprising:
   a slope acquisition unit configured to acquire a slope of output samples between neighboring samples of the approximation table as an approximated value of a derivative value of the activation function for back-propagation in the learning process.

10. A computing method for activation function computation of a neural network, comprising:
    retaining, by a computing apparatus, an approximation table that approximately represents an activation function of a neural network, the approximation table mapping between a plurality of discrete input samples of the activation function and a plurality of output samples, the plurality of output samples respectively corresponding to the plurality of input samples; and
    converting an input value of the activation function computation to an output value using the approximation table when the activation function is selected for the activation function computation,
    wherein the plurality of input samples of the approximation table are set such that input samples more distant from a reference point in the domain of the activation function have a larger neighboring sample interval, and
    wherein the neighboring sample interval is set such that the neighboring sample interval increases, from a basic sample interval at the reference point as a baseline, by a constant ratio or a constant increment with increasing distance from the reference point.

11. A non-transitory computer-readable storage medium having stored therein a computer program which causes a processor of a computing apparatus that performs activation function computation of a neural network to perform:
    retaining an approximation table that approximately represents an activation function of the neural network, the approximation table mapping between a plurality of discrete input samples of the activation function and a plurality of output samples, the plurality of output samples respectively corresponding to the plurality of input samples; and
    converting an input value of the activation function computation to an output value using the approximation table when the activation function is selected for the activation function computation, wherein the plurality of input samples of the approximation table are set such that input samples more distant from a reference point in the domain of the activation function have a larger neighboring sample interval, and wherein the neighboring sample interval is set such that the neighboring sample interval increases, from a basic sample interval at the reference point as a baseline, by a constant ratio or a constant increment with increasing distance from the reference point.

12. A table generating apparatus comprising:

a receiving unit configured to receive a designation of an activation function of a neural network; and a generation unit configured to generate an approximation table that approximately represents the designated activation function, the approximation table mapping between a plurality of discrete input samples of the activation function and a plurality of output samples, the plurality of output samples respectively corresponding to the plurality of input samples, wherein the generation unit is configured to set the plurality of input samples of the approximation table such that input samples more distant from a reference point in the domain of the activation function have a larger neighboring sample interval, and wherein the neighboring sample interval is set such that the neighboring sample interval increases, from a basic sample interval at the reference point as a baseline, by a constant ratio or a constant increment with increasing distance from the reference point.

13. The table generating apparatus according to claim 12, wherein the reference point is an origin of the domain.

14. The table generating apparatus according to claim 12, wherein the reference point is a point at which an absolute value of a slope of the activation function is locally maximal.

15. The table generating apparatus according to claim 14, wherein, when there are a plurality of local maximal points at which an absolute value of a slope of the activation function is locally maximal, the generation unit is configured to set a plurality of reference points corresponding to the plurality of local maximal points.

16. The table generating apparatus according to claim 12, wherein the generation unit is configured to adjust the neighboring sample interval such that an amount of change in a slope of the activation function in a segment between neighboring samples does not exceed a threshold.

* * * * *